3,667,823
ALUMINUM BASED ALLOY BEARING
Fred J. Webbere, Orchard Lake, Mich., assignor to General Motors Corporation, Detroit, Mich.
Original application Oct. 29, 1968, Ser. No. 771,416, now Patent No. 3,562,884, dated Feb. 16, 1971. Divided and this application Aug. 10, 1970, Ser. No. 62,391
Int. Cl. F16c 33/12
U.S. Cl. 308—237
6 Claims

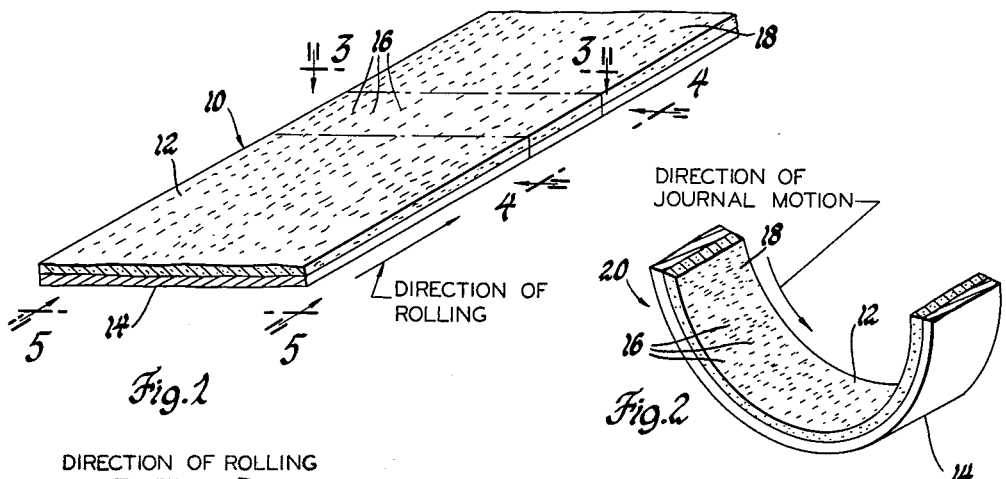
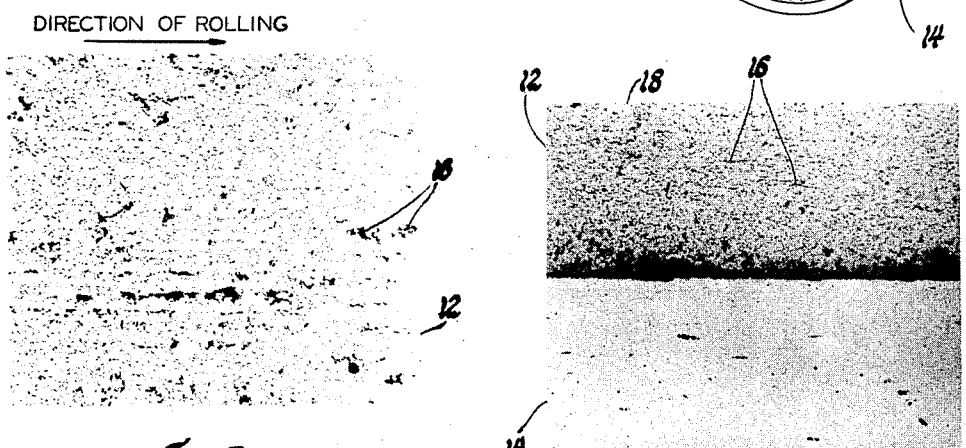
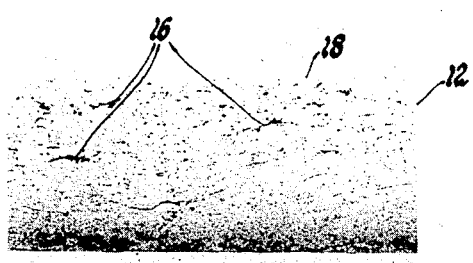
Fig. 1
Fig. 2
Fig. 3
Fig. 4
Fig. 5
INVENTOR
Fred J. Webbere
BY
George A. Growe
ATTORNEY United States Patent Office 3,667,823
Patented June 6, 1972

ABSTRACT OF THE DISCLOSURE

In a preferred embodiment a cast strip of aluminum bearing alloy containing a minor portion of lead dispersed as small spherical particles in the aluminum matrix is rolled lengthwise, whereby the soft lead particles are flattened and lengthened in the direction of rolling. Sleeve bearing blanks are then cut from the cast and rolled strip in a direction and manner such that the longest dimension of the flattened lead particles in the finished bearing is transverse to the intended direction of rotation of a mating journal member.

---

This is a division of Ser. No. 771,416, filed Oct. 29, 1968, now Pat. No. 3,562,884, issued Feb. 16, 1971.

This invention relates to the processing of aluminum based bearing material suitable for sleeve bearings and the like. More particularly, this invention relates to aluminum bearing alloys containing a dispersed phase of soft metal and to a method of processing such alloys whereby the soft phase is formed into generally flat elongated platelets substantially parallel to the bearing surface. The orientation of the platelets in the finished bearing member is arranged and controlled to provide the most advantageous exposure of the soft phase with respect to bearing operation.

In U.S. Pat. No. 3,410,331, issued Nov. 12, 1968, entitled "Method of Casting an Aluminum Based Bearing Alloy" and assigned to the assignee of the subject invention, a method is disclosed for forming a cast bearing alloy containing generally spherical particles of lead dispersed in an aluminum matrix. In accordance with the teachings of the aforesaid patent, a strip of lead containing aluminum based alloy is cast in a manner whereby the concentration of lead increases in a direction from one surface of the strip to the opposite surface. This previous patent, Pat. No. 3,410,331, which is incorporated by reference herein, teaches that the dispersion of minute lead particles in an aluminum matrix provides an excellent bearing material particularly for use in sleeve bearings and the like. In general, the cast aluminum strip is eventually bonded to a steel backing strip for support, the low lead concentration side of the aluminum strip being bonded to the steel backing and the high lead concentration side of the aluminum strip becoming the bearing surface. Bearing materials of the described composition and structure provide excellent bearing properties due to the dispersion of the lead babbitt in the aluminum matrix. In fact, sleeve bearings of this type have been found to have properties equal to or superior to the same properties of more expensive lead-free aluminum alloy sleeve bearings which are provided with an overplate of babbitt metal.

It is an object of the present invention to provide an improved method of processing a cast aluminum based bearing alloy, containing a dispersion of a suitable soft metal, to place the dispersed soft metal in a form having maximum surface exposure of the soft phase for the purpose of optimizing the properties of the bearing material.

It is another object of the present invention to provide an aluminum based bearing material containing therein a dispersion of a soft metal, such as lead or other babbitt metal, wherein the dispersed soft metal is in a specific configuration and orientation which offers the optimum exposure thereof at a bearing surface from the standpoint of improved score resistance and embedability of foreign particles.

In accordance with a preferred embodiment of my invention, these and other objects are accomplished by first providing a cast strip of aluminum based alloy having incorporated therein a dispersed phase of finely divided, generally spherically shaped lead particles. In general, it is preferred that the cast strip be formed in accordance with the teachings of the above-identified Pat. No. 3,410,331 so that the lead concentration increases in a direction from one of the principal surfaces of the cast strip to the other. The cast strip is milled, machined or otherwise trimmed to a suitable predetermined dimension and then rolled to obtain a reduction in thickness and, when desired, to bond the cast aluminum alloy strip to a suitable backing material such as steel. The cast strip is preferably rolled lengthwise. Besides obtaining a reduction in the thickness of the strip by the rolling operation the spherical lead particles are flattened and, in some cases fragmented and converted for the most part into flat platelets in the aluminum matrix. The thin dimension of each platelet is roughly perpendicular to the rolled surface. The broad dimensions of a major portion of the platelets lie in or parallel to the plane of the working surface of the bearing material. The cast and rolled strip is cut into bearing blanks which are processed by conventional forming and machining operations into bearings, such as plain sleeve bearings. However, in accordance with my invention the cutting or shearing of the blanks from the main strip is undertaken in a direction and manner so that the longest dimension of the soft metal platelets in the finished bearing will lie transverse to the intended direction of rotation of a mating journal member or the like. In other words, the intended direction of rotation of a journal member with respect to the finished bearing material is transverse to the direction in which the bearing material was originally rolled. In this way the flat elongated soft particles lie crossways to the movement of the journal to provide the maximum exposed area and opportunity for embedding foreign particles entrained between the rotating journal and the bearing surface and to minimize scoring of the bearing surface.

These and other objects and advantages of my invention will become more apparent from a detailed description thereof, reference being had to the attached drawings in which:

FIG. 1 is a perspective view of a roll bonded bimetal strip of aluminum-soft metal alloy backed with steel;

FIG. 2 is a perspective view of a bimetal sleeve bearing formed from a blank sheared from the strip of FIG. 1 in the manner indicated;

FIG. 3 is a photomicrograph at 100× of a portion of the aluminum alloy surface of the roll bonded strip of FIG. 1;

FIG. 4 is a photomicrograph at 100× of a section of the bimetal strip of FIG. 1, viewed from the side; and FIG. 5 is a photomicrograph at 100× of a section of the bimetal strip of FIG. 1, viewed endwise.

In the following detailed description of a preferred manner of practicing my invention, reference is made to the use of an aluminum-lead alloy prepared in accordance with the above-identified Pat. No. 3,410,331, which is eventually roll bonded to a steel backing. It will be recognized, however, that my invention is equally applicable to aluminum alloys containing soft metals other than lead, such as cadmium or bismuth, and which are not necessarily provided with a backing layer.

Molten alloy was prepared in an induction heating furnace, the alloy comprising by weight about 4.75% lead, 0.5% tin, 4% silicon, 1% cadmium, 0.10% magnesium, 0.20% manganese, 0.10% copper and the balance aluminum. After being heated to a temperature of about 1750° F. the molten metal was caused to flow from the induction furnace into a horizontally disposed, open ended mold, such as that depicted in FIG. 2 of the above-identified patent. The rate of cooling of the metal in the mold was controlled so that droplets of liquid lead forming in the molten aluminum were permitted to migrate under the influence of gravity before the aluminum completely solidified. In this way a dispersion of fine, generally spherical particles of lead was found throughout the aluminum matrix but with a gradient in the lead concentration from the top to the bottom of the horizontally cast strip. Because lead is more dense than aluminum, the concentration of the dispersed lead phase increased in the direction from the top to the bottom of the cast strip. A microscopic examination of the cast strip, such as is depicted in FIGS. 3 and 4 of the above-identified Pat. No. 3,410,331, clearly shows that the dispersed lead particles are generally spherical in configuration in the as-cast strip.

In this example the open ended mold was arranged and constructed so that the cast strip was rectangular in cross section, about ⅜ inch in thickness and 5¼ inches wide. A small amount of material was milled from both the top and bottom surfaces to provide a strip having more precisely parallel surfaces. Sections of cast strip two hundred feet in length were rolled into coils and the coils annealed and stress relieved. The coiled and annealed strip, now slightly less than ⅜ inch in thickness, was passed repeatedly between suitable rollers whereby the thickness of the strip was reduced to about 0.050 inch. The strip was not permitted to expand substantially in width. Therefore, an approximately six-fold elongation was obtained. Subsequent to the last pass between the rollers the edges of the strip were trimmed so that the width thereof was equivalent to the intended semicircumferential length of the ultimate sleeve bearing to be produced.

After the rolling and trimming operations the strip of aluminum-babbitt metal alloy was annealed. The rolled and annealed strip was then suitable for roll bonding with a low-carbon steel backing layer. This was accomplished by preheating a thin steel backing strip of substantially the same width as the aluminum based strip to about 1200° F.; juxtaposing the aluminum strip and the steel strip, the low lead side of the aluminum strip being against the steel strip, and passing the two strips between suitable rollers. During the roll bonding operation the aluminum strip underwent a further reduction in thickness, approximately 3 to 1, and became firmly and coextensively bonded to the steel backing. At this stage the thickness of the aluminum layer in the bimetal strip was about 0.016 inch to 0.018 inch. A perspective view depicting a typical section of aluminum bearing material-steel backing bimetal strip is shown in FIG. 1 at 10. The relative thicknesses of aluminum material 12 and steel backing 14 are not necessarily accurately represented. As indicated above, the strip was rolled lengthwise in each instance so that the dispersed lead particles 16 (with which some tin and cadmium is associated), which are exaggerated in size for purposes of illustration, are flattened and elongated in the direction of rolling. The photomicrograph of FIG. 3 portrays the fragmented and flattened lead particles 16 in the aluminum matrix. FIG. 4 is a photomicrograph of a section of the roll bonded bimetal strip as viewed from the side, the aluminum based layer 12 being bonded to the steel layer 14. The lead particles 16 at this stage are extremely thin and scarcely visible in marked contrast to the generally spherical shaped particles in the as-cast alloy, as depicted in FIGS. 3 and 4 of the above-identified Pat. No. 3,410,331. The thin lead platelets 16 are seen to be substantially parallel to the top surface 18 of the aluminum layer.

FIG. 5 is a photomicrograph of a section taken in a plane perpendicular to the direction of rolling or, in other words, an end view of the roll bonded strip. The lead platelets 16 are seen to be quite thin and generally parallel to the exposed upper surface of the aluminum portion.

Bearing blanks are now cut or sheared from the bimetal strip. In this example a plain sleeve bearing, illustrated at 20 in FIG. 2, is to be formed and the direction of motion of the mating journal member will be as indicated by the arrow. Accordingly, the bearing blanks are in this instance sheared crossways from the bimetal strip. The blanks are formed into half circle shapes with the aluminum layer 12 being inward of the steel backup layer 14. At this point any final machining operations are performed on the bearing which may be necessary to trim the article to its final dimensions.

The soft dispersed lead platelets 16 at the surface of the aluminum layer and dispersed throughout are shown at FIG. 2 as being aligned with their longest dimension perpendicular or transverse with respect to the direction of rotation of a journal member and the elongated platelets and fragments of platelets are so oriented that the two major dimensions thereof are in planes generally parallel to the bearing surface. In this arrangement the lead babbitt phase provides maximum embedability of foreign particles which typically are entrained between the moving journal and the bearing surface. This is because any foreign particles so entrained are moving in a direction crossways to the elongated platelets and are much more likely to encounter a soft phase. Moreover, in the arrangement described, the soft lead phase is most effective in increasing the score resistance of the bearing surface. The described method of processing aluminum-soft metal alloys and particularly aluminum-lead alloys provides a bearing material offering most of the desirable properties of the conventional aluminum-silicon-cadmium bearing alloys having a lead babbitt overplate for score resistance and embedability, but the subject composition is less expensive to manufacture.

My invention is particularly applicable to cast aluminum-soft metal alloys wherein the soft metal is present as a distinct phase in an aluminum matrix. In general, it is necessary and preferred that the soft metal phase be a dispersion of more or less spherical particles in the as-cast condition. In order that this can be achieved there must be a suitable temperature range above the temperature at which aluminum solidifies wherein the molten soft metal has low solubility in molten aluminum. Therefore, as the higher melting aluminum solidifies the soft metal is entrained as a separate phase in the aluminum matrix. In a preferred form of the invention the molten soft metal may be caused to migrate in the molten aluminum to achieve a gradient in the concentration of the soft metal in the final casting.

Lead, cadmium and bismuth are examples of soft metals which have limited solubility in molten aluminum at temperatures just above the solidification temperature of aluminum. Lead has a maximum solubility of about one to two percent by weight in aluminum under these conditions. Bismuth has a maximum solubility of about three percent by weight of molten aluminum, and cadmium forms a separate liquid phase in molten aluminum (at temperatures just above the melting point of aluminum) when present in quantities greater than about eight to nine percent by weight of the binary mixture. It will be appreciated that the above stated solubility limits are for the respective aluminum-soft metal binary systems, and that the presence of other alloying metals may markedly increase or decrease these solubility values.

Accordingly, soft metals such as lead, bismuth and cadmium may be alloyed with aluminum and cast into a strip wherein at least some of the soft metal is dispersed as generally spherical particles in an aluminum matrix.

The strip may then be rolled and cast into bearing blanks in the above-described manner to obtain my improved bearing properties. In general, the soft metal(s) will form a minor portion, less than about 15% to 20% by weight, of the aluminum based alloy. Preferably, lead is employed as the principal soft metal in amounts of about one to ten percent by weight of the aluminum alloy.

While my invention has been described in terms of a preferred embodiment thereof it is recognized that other forms could be adapted by one skilled in the art and, therefore, the scope of my invention should be considered limited only by the following claims.

What is claimed is:

1. A bearing blank in the form of a rolled strip of metal comprising a major portion of aluminum and a minor portion of a soft metal, said soft metal being present as a dispersion of generally flat elongated platelets in an aluminum matrix, said platelets being generally parallel to a major flat surface of said bearing blank and the longest dimension of said platelets being transverse to an intended direction of rotation of a journal member adapted to mate with a bearing formed from said bearing blank.

2. A bearing blank in the form of a rolled strip of metal comprising a major portion of aluminum and a minor portion of a soft metal selected from the group consisting of lead, cadmium and bismuth, said soft metal being present as a dispersion of generally flat elongated platelets in an aluminum matrix, said platelets being generally parallel to a major flat surface of said bearing blank and the longest dimension of said platelets being transverse to an intended direction of rotation of a journal member adapted to mate with a bearing formed from said bearing blank.

3. A bearing blank in the form of a rolled cast strip in which at least a portion of said bearing blank is a layer of aluminum alloy containing a minor portion, up to about 20% by weight, of a soft metal selected from the group consisting of lead, cadmium and bismuth, said soft metal being present as a dispersion of generally flat elongated platelets in an aluminum matrix, said platelets being generally parallel to a major flat surface of said bearing blank and the longest dimension of said platelets being transverse to an intended direction of rotation of a journal member adapted to mate with a bearing formed from said bearing blank.

4. A rolled cast bearing blank strip in which at least a portion of said strip is a layer of aluminum alloy containing about 1% to 10% by weight lead, said lead being present as a dispersion of generally flat platelets in an aluminum matrix, said lead platelets being generally parallel to a major flat surface of said bearing blank strip and the longest dimension of said platelets being transverse to an intended direction of rotation of a journal member adapted to mate with a bearing formed from said bearing blank.

5. A composite sleeve bearing comprising a rolled aluminum alloy bearing layer and a backup layer integrally bonded to one side of said bearing layer, said bearing layer comprising a major portion of aluminum and a minor portion, up to about 20% by weight, of a soft metal selected from the group consisting of lead, cadmium and bismuth, said soft metal being present as a dispersion of generally flat, elongated platelets in an aluminum matrix, said platelets being generally parallel to the bearing surface of said bearing layer and the longest dimension of said platelets being transverse to an intended direction of rotation of a journal member adapted to mate with said bearing.

6. A composite sleeve bearing comprising a rolled aluminum alloy bearing layer and a steel backup layer integrally bonded to one side of said bearing layer, said bearing layer being an aluminum alloy containing about 1% to 10% by weight lead, said lead being present as a dispersion of generally flat platelets in an aluminum matrix, said lead platelets being generally parallel to the bearing surface of said bearing layer and the longest dimension of said platelets being transverse to an intended direction of rotation of a journal member adapted to mate with said bearing.

References Cited
UNITED STATES PATENTS

| | | | |
|---|---|---|---|
| 3,221,392 | 12/1965 | Gould et al. | 29—191.2 X |
| 2,537,591 | 1/1951 | Klein | 29—191.2 X |
| 2,815,567 | 12/1957 | Gould et al. | 29—191.2 X |
| 3,410,331 | 11/1968 | Miller et al. | 164—51 |
| 2,971,248 | 2/1961 | Kingsley et al. | 308—239 X |

MARTIN P. SCHWADRON, Primary Examiner

B. GROSSMAN, Assistant Examiner